(12) United States Patent
Gu et al.

(10) Patent No.: US 9,689,311 B2
(45) Date of Patent: Jun. 27, 2017

(54) METHOD FOR MONITORING PERFORMANCE OF THE LUBRICANT COOLER IN AIRCRAFT AUXILIARY POWER UNIT

(71) Applicant: Air China Limited, Beijing (CN)

(72) Inventors: Zhuping Gu, Beijing (CN); Huifeng Ding, Beijing (CN); Fengliang Zheng, Beijing (CN); Jiaju Wu, Beijing (CN); Lei Chen, Beijing (CN); Lei Huang, Beijing (CN); Hailong Zhang, Beijing (CN); Bingzheng Wang, Beijing (CN)

(73) Assignee: AIR CHINA LIMITED, Beijing (CN)

( * ) Notice: Subject to any disclaimer, the term of this patent is extended or adjusted under 35 U.S.C. 154(b) by 336 days.

(21) Appl. No.: 14/338,568

(22) Filed: Jul. 23, 2014

(65) Prior Publication Data
US 2016/0230659 A1   Aug. 11, 2016

(30) Foreign Application Priority Data

Jul. 24, 2013 (CN) .......................... 2013 1 03138767

(51) Int. Cl.
*G01M 15/14*   (2006.01)
*F02C 7/14*   (2006.01)
(Continued)

(52) U.S. Cl.
CPC ................ *F02C 7/14* (2013.01); *B64D 33/08* (2013.01); *F01M 5/002* (2013.01); *G01M 15/14* (2013.01); *B64D 41/00* (2013.01); *F01M 11/10* (2013.01); *F05D 2220/50* (2013.01); *F05D 2260/80* (2013.01); *F05D 2260/98* (2013.01); *Y02T 50/671* (2013.01); *Y02T 50/675* (2013.01)

(58) Field of Classification Search
CPC ........ B64D 33/08; F01M 11/10; F01M 5/002; F05D 2220/50; F05D 2260/80; F05D 2260/98; F02C 7/14; G01M 15/14
USPC ....................................................... 73/112.01
See application file for complete search history.

(56) References Cited

U.S. PATENT DOCUMENTS 5,408,821 A * 4/1995 Romero ................. B64D 41/00
                                                           60/39.15
6,470,735 B1   10/2002 Bell
(Continued)

FOREIGN PATENT DOCUMENTS

| CN | 102862685 A | 1/2013 |
| CN | 102897327 A | 1/2013 |

*Primary Examiner* — Freddie Kirkland, III
(74) *Attorney, Agent, or Firm* — Brundidge & Stanger, P.C.

(57) ABSTRACT

The present invention relates to a method for detecting performance of the lubricant cooler in aircraft auxiliary power unit APU, comprising: acquiring APU-related messages within a time period; obtaining the operation parameters of the APU lubricant cooler, the operation parameters comprise: lubricant temperature OT and load compressor inlet temperature LCIT; the revised lubricant temperature OT is obtained by the following formula: the revised lubricant temperature=lubricant temperature OTA−the load compressor inlet temperature LCIT; determining the performance of the APU lubricant cooler is in stable phase, decline phase or malfunction phase according to the change trend of the revised lubricant temperature OT with respect to time.

20 Claims, 10 Drawing Sheets

(51) Int. Cl.
*B64D 33/08* (2006.01)
*F01M 5/00* (2006.01)
*F01M 11/10* (2006.01)
*B64D 41/00* (2006.01)

(56) References Cited

U.S. PATENT DOCUMENTS

| | | | | |
|---|---|---|---|---|
| 7,062,370 | B2* | 6/2006 | Vhora | G05B 23/0281 |
| | | | | 701/100 |
| 7,331,169 | B2* | 2/2008 | Riley | F02C 7/26 |
| | | | | 60/39.281 |
| 7,369,932 | B2* | 5/2008 | Kim | F01D 21/00 |
| | | | | 477/30 |
| 7,805,947 | B2* | 10/2010 | Moulebhar | F01D 21/003 |
| | | | | 60/39.163 |
| 8,467,949 | B2* | 6/2013 | Kim | F02C 7/26 |
| | | | | 701/100 |
| 8,798,848 | B2* | 8/2014 | Gu | G06F 17/00 |
| | | | | 701/29.4 |
| 8,862,364 | B2* | 10/2014 | Kim | F02C 7/26 |
| | | | | 340/4.32 |
| 2005/0222747 | A1* | 10/2005 | Vhora | G05B 23/0281 |
| | | | | 701/100 |
| 2006/0195248 | A1* | 8/2006 | Kim | F01D 21/14 |
| | | | | 701/100 |
| 2007/0260390 | A1* | 11/2007 | Kim | F01D 21/00 |
| | | | | 701/100 |
| 2009/0048730 | A1* | 2/2009 | Akkaram | G07C 5/006 |
| | | | | 701/31.4 |
| 2010/0070130 | A1 | 3/2010 | Suzuki et al. | |
| 2012/0312023 | A1* | 12/2012 | Ertz | F02C 7/06 |
| | | | | 60/772 |
| 2013/0013222 | A1* | 1/2013 | Gu | F02C 9/00 |
| | | | | 702/33 |
| 2013/0179028 | A1* | 7/2013 | Gu | G06F 17/00 |
| | | | | 701/29.4 |
| 2013/0227959 | A1* | 9/2013 | Ainslie | F02C 7/26 |
| | | | | 60/778 |
| 2016/0230676 | A1* | 8/2016 | Huang | G05B 23/0235 |
| 2016/0230737 | A1* | 8/2016 | Gu | G05B 23/0235 |

* cited by examiner

APU MES/IDLE REPORT <13>

| | A/C ID | DATE UTC | FROM | TO | FLT |
| --- | --- | --- | --- | --- | --- |
| | Plane No. | UTC Time | Flying | Ground | Flight No. |
| CC | BXXXX | yyyy-dd-mm xx:xx:xx | -- | -- | -- |
| | PH | CNT | CODE | BLEEDSTATUS | APU |
| | Segment | Count | Trigger Code | State of Bleed Air Valve | Bleed Air Valve of APU |
| C1 | 11 | 76401 | 4000 | 16 0000 1 00000 19 | 1 |
| | TAT | ALT | CAS | MN | GW | CG | DMU |
| | Total Temperature | Datum Mark | Calculation of airspeed | Mach Speed | Total Weight | Gravity Center | Version |
| CE | 23.3 | 150 | -- | -- | 65600 | 29.2 | 171CA2 |
| | ASN | AHRS | ACYC | PHAD | | | |
| | APU Serial Number | APU Hours | APU Cycle | APU Performance Adjustment | | | |
| EJ | 2056 | 18477 | 16894 | 4000 | | | |
| | ESN | ACW1 | ACW2 | NA | EGTA | IGV |
| | Engine No. | Control Word 1 | Control Word 2 | Rotation Speed | Exhausted Gas Temperature | IGV Position |
| N1 | 011909 | 00000 | 0A000 | 99.7 | 588 | -5 |
| N2 | 011473 | 00000 | 0A000 | 99.8 | 580 | -5 |
| N3 | 000000 | 00000 | 04000 | 99.8 | 388 | 82 |
| | P2A | LCIT | WB | PT | LCDT | OTA | GLA |
| | Inlet Gas pressure | Inlet Temperature of Load Compressor | Bleed Air Flow | Bleed Air pressure | Outlet Temperature of Load Compressor | Lube Oil Temperature | APU Generator Load |
| S1 | .956 | 33 | .41 | 3.99 | XXXX | 110 | 38 |
| S2 | .952 | 32 | .41 | 3.99 | XXXX | 110 | 27 |
| S3 | .96 | 32 | 0 | 1.17 | XXXX | 107 | 0 |

PREVIOUS APU START (Parameters on start of APU)

| | STA | EGTP | NPA | OTA | ICIT |
| --- | --- | --- | --- | --- | --- |
| | Start Time | EGT Peak Value | Rotation Speed at Peak Value of EGT | Lube Oil Temperature | Inlet Temperature of Load Compressor |
| V1 | 49 | 808 | 35 | 110 | 32 |

METHOD FOR MONITORING PERFORMANCE OF THE LUBRICANT COOLER IN AIRCRAFT AUXILIARY POWER UNIT

TECHNICAL FIELD

The present invention relates to a method for monitoring performance of an aircraft component, in particular to a method for monitoring performance of the lubricant cooler in the aircraft auxiliary power unit.

BACKGROUND ART

Auxiliary Power Unit, abbreviated as APU, is a small turbine engine mounted on the tail of an aircraft. Its main function is to supply power and a gas source, and some APUs are capable of providing additive thrust to the aircraft. Specifically, before taking off from the ground, an aircraft may rely on power and gas supply from the APU to start the main engine, rather than the ground power and gas source vehicles. While on the ground, the APU also supplies power and compressed air to ensure lighting and air-conditioning in the cabin and cockpit. During take-off of an aircraft, the APU can serve as a backup power source. After the aircraft is landed, lighting and air-conditioning of the aircraft are still maintained by power from the APU. The functions of APU influences the flight stability of the aircraft, which directly affects flight cost and quality of service of the aircraft.

APU lubricant cooler is an important component in APU, and the operation of APU is directly impacted by the performance of the lubricant cooler. Poor operation of lubricant cooler is likely to result in shut-down of APU, or even grounding of the aircraft. Once grounding occurs, the cost for consequent maintenance and repair is very expensive. At present, there are two methods for maintenance of the APU lubricant cooler. One is weekly inspection, that is, measuring and calculating the temperature of the lubricant weekly, and checking whether the temperature exceeds the limit. However, due to omission, uninspected case of exceed the temperature limit may happen, and thus the shut-down of APU cannot be avoided absolutely. The other is periodical inspection of lubricant cooler according to the reliable statistical data. Although the latter can effectively avoid the shut-down of APU caused by the performance degradation of the lubricant cooler, replacement or repair in fixed period cost more air materials, and hence it is not beneficial for reducing the maintenance cost.

Therefore, an effective method for monitoring the performance of APU lubricant cooler is desired in the art so that the system may issue an alarm in case of dysfunction of lubricant cooler. Thus, omitted inspection or over maintenance of APU lubricant cooler will not happen.

SUMMARY

For the above technical problem existing in the prior art, there is provided, according to one aspect of the present invention, a method for monitoring the lubricant cooler in an auxiliary power unit, comprising: acquiring APU messages within a period; obtaining the operation parameters of the AUP lubricant cooler according to the APU messages, the operation parameters including lubricant temperature OTA and load compressor inlet temperature LCIT; obtaining the revised lubricant temperature OT through the following formula: revised lubricant temperature OT=lubricant temperature OTA−load compressor inlet temperature LCIT; and determining the performance of the APU lubricant cooler is in stable phase, decline phase or malfunction phase according to the change trend of the revised lubricant temperature OT with respect to time.

According to the above method, wherein the step of determining the performance of the APU lubricant cooler is in stable phase, decline phase or malfunction phase comprises: response to the change trend is less than the threshold value of decline, determining the performance of the APU lubricant cooler is in stable phase; response to the change trend is greater than the threshold value of decline and less than the threshold value of malfunction, determining the performance of the APU lubricant cooler is in decline phase; and response to the change trend is greater than the threshold value of malfunction, determining the performance of the APU lubricant cooler is in malfunction phase.

The method described above, further comprises: determining the stable change trend of the revised lubricant temperature OT with respect to time when the APU lubricant cooler is in stable phase; wherein, the threshold value of the decline phase is around 1.5-2.5 times than the stable change trend, and the threshold value of malfunction is around 5-7 times than the stable change trend.

The method described above, wherein the decline phase further comprises serious decline phase, and the threshold value of serious decline is between the threshold values of the decline and malfunction, response to the change trend is greater than the threshold value of the serious decline and less than the threshold value of malfunction, determining the performance of the APU lubricant cooler is in serious decline phase; wherein the method further comprises: determining the stable change trend of the revised lubricant temperature OT with respect to time when the APU oil lube cooler is in stable phase; wherein, the threshold value of the serious decline is around 2.5-5 times than the stable change trend.

The method described above, further comprises: the time is time since installation TSR of APU.

The method described above, wherein the time period is about 5-10 days.

The method described above, wherein about 20-30 APU messages are obtained within the time period.

The method described above, wherein the APU messages are triggered to obtain the operation parameters when the APU load is at its peak.

The method described above, wherein a plurality of the APU messages are triggered to obtain the operation parameters in the same APU load.

The method described above, further comprises: response to the lubricant temperature OTA exceeding the first threshold, inputting the warning signal.

The method described above, further comprises: response to the revised lubricant temperature OT exceeding the second threshold, inputting the warning signal.

The method described above, further comprises: calculating the average value AVG and the deviation index $\delta$ of the revised lubricant temperature OT within the time period; determining the revised lubricant temperature $OT_{next}$ obtained according to the next message related to APU; and response to $OT_{next}$ is greater than AVG+n$\delta$ or less than AVG−n$\delta$, determining whether the revised lubricant temperature $OT_{next+1}$ obtained according to the further next message related to APU is equally greater than AVG+n$\delta$ or less than AVG−n$\delta$; response to the revised lubricant temperature obtained according to the message related to APU is equally greater than AVG+n$\delta$ or less than AVG−n$\delta$ continuously and exceeding the predetermined number Z, inputting the warning; wherein n is 2-5, and Z is 3-5.

The method described above, response to the revised lubricant temperature obtained according to the message related to APU is greater than AVG+nδ or less than AVG−nδ, recalculating the average value AVG and deviation index δ of the revised lubricant temperature OT.

The method described above, response to the revised lubricant temperature obtained according to the message related to APU is equally greater than AVG+nδ or less than AVG−nδ continuously and exceeding the predetermined number Z, recalculating the average value AVG and deviation index δ of the revised lubricant temperature OT.

The method described above, wherein the deviation index δ is standard deviation.

The method described above, wherein the value of n is 2 or 3.

The method described above, wherein the value of Z is 3.

The method described above, further comprises that: response to the revised lubricant temperature obtained according to the message related to APU is greater than AVG+nδ continuously and exceeding the predetermined number Z, inputting the warning of lubricant cooler.

The method described above, further comprises that: response to the revised lubricant temperature obtained according to the message related to APU is greater than AVG−nδ continuously and exceeding the predetermined number Z, inputting the warning of sensor.

The method described above, further comprises that: estimating the time when the lubricant sensor encounter a malfunction.

According to one aspect of the invention, a device for monitoring the performance of the lubricant cooler of the aircraft auxiliary power unit APU is provided, which comprises: message acquiring and analyzing unit, which acquires the APU messages within a time period, and obtains the operation parameters of the APU lubricant cooler, the operation parameters includes: the time since installation TSR of APU, the lubricant temperature OTA and load compressor inlet temperature LCIT; temperature revised unit, which obtains the revised temperature of lubricant OT:

revised temperature of lubricant OT=lubricant temperature OTA−load compressor inlet temperature LCIT; and performance monitoring unit, which determines that the performance of the APU lubricant cooler is in stable phase, decline phase, serious decline phase or malfunction phase according to the change trend of the revised lubricant cooler OT against the time since installation (TSR) of APU.

According to another aspect of the invention, a device for monitoring the performance of the lubricant cooler of the aircraft auxiliary power unit APU is provided, which comprises: a processor; and a memory linked with the processor, which stores the computer-readable codes; the computer-readable codes run in the processor to execute the following steps: acquiring the APU messages within a time period; obtaining the operation parameters of the APU lubricant cooler, the operation parameters includes: the time since installation TSR of APU, the lubricant temperature OTA and load compressor inlet temperature LCIT; the revised temperature of lubricant OT is obtained by the following formula: revised temperature of lubricant OT=lubricant temperature OTA−load compressor inlet temperature LCIT; determining that the performance of the APU lubricant cooler is in stable phase, decline phase, serious decline phase or malfunction phase according to the change trend of the revised lubricant cooler OT against the time since installation (TSR) of APU.

DESCRIPTION OF DRAWINGS

Hereinafter, preferred embodiments of the present invention will be further described with reference to the accompany drawings, wherein:

FIG. 3 is drawing illustrating an example of the A13 message of Airbus;

FIGS. 4a-4c are drawings illustrating the revising process of lubricant temperature according to an embodiment of the invention, wherein, FIG. 4a shows the lubricant temperature OTA before revising, FIG. 4b shows the load compressor inlet temperature LCIT representing the outer temperature, FIG. 4c shows the revised lubricant temperature OT;

FIGS. 5a-5d are drawings illustrating the change of performance of the APU lubricant cooler according to one embodiment of the invention, wherein, FIG. 5a is the schematic drawing showing a curve of the change of performance of the APU lubricant cooler, FIG. 5b shows a statistical trend of the performance data in early phase of operation, FIG. 5c shows a statistical trend of the performance data in late phase of operation, FIG. 5d shows a statistical trend of the long-term performance data of the lubricant cooler.

MODE OF INVENTION

Figure 1:
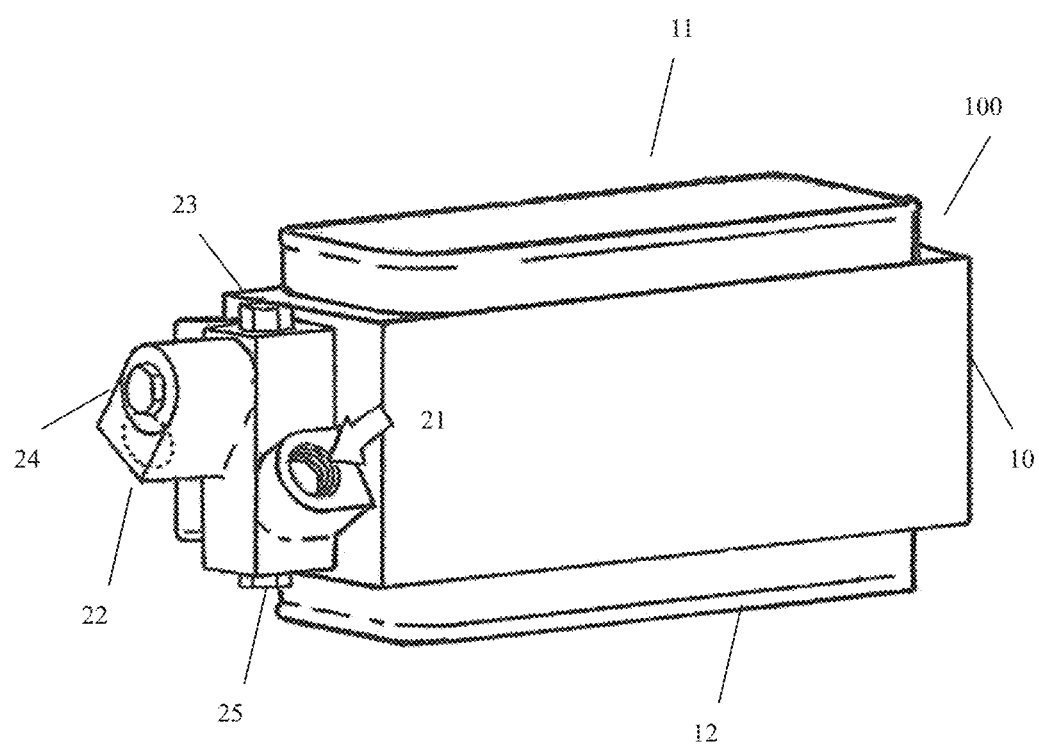
FIG. 1 is a schematic drawing illustrating the structure of lubricant cooler of the aircraft APU according to one embodiment of the present invention.

Hereinafter, in order to give a clearer picture of the purposes, technical solutions and advantages of the embodiments of the present invention, the technical solutions in the embodiments of the present invention will be further described, taken in conjunction with the accompanying drawings in the embodiments of the present invention. Apparently, the described embodiments are only part of the invention rather than all embodiments. Based on the embodiments in the present invention, all other embodiments a person with ordinary skill in the art achieves without any creative effort shall fall within the protection scope of the present invention.

In the following detailed description, please refer to each drawing of the specification regarded as a portion of the application for illustrating the specific embodiment of the invention. In the drawings of the specification, similar reference signs describe substantially identical components in different schemas. Each specific example of the application are described with sufficient details in the following, in order to enable persons skilled in the art to embody the technical solution of the application. It should be understood that, other examples or modifications to the structure, logic or electrical characteristics of the examples of the application can also be used.

Figure 2:
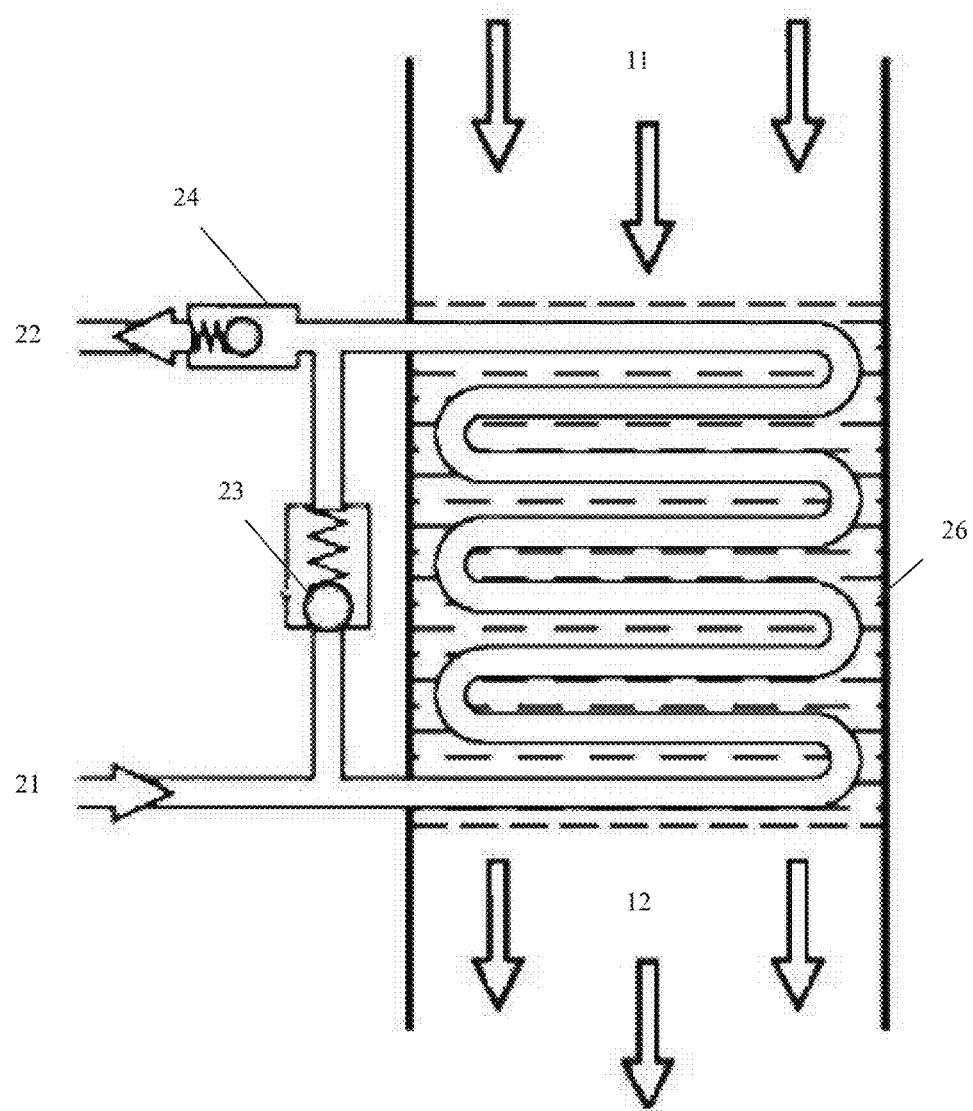
FIG. 2 is a schematic drawing illustrating internal structure of the lubricant cooler and its operation principle.

Referring FIGS. 1 and 2, FIG. 1 is a schematic drawing illustrating the structure of lubricant cooler of the aircraft APU according to one embodiment of the present invention. FIG. 2 is a schematic drawing illustrating internal structure of the lubricant cooler and its operation principle. As shown in the figures, lubricant cooler 100 comprises lubricant cooler housing body 10 and lubricant channel component 20. The lubricant cooler housing body 10 has a cooling air inlet 11 and a cooling air outlet 12. The lubricant channel component 20 comprises lubricant inlet 20, lubricant outlet 22, bypass valve 23, inspection valve 24, drain plug 25 and heat dissipating oil channel 26. The cooling air enters into the housing body 10 through the cooling air inlet 11, and comes into atmosphere through cooling air outlet 12 after passing through the heat dissipating oil channel 26 inside the housing body 10. The high-temperature lubricant enters into the heat dissipating oil channel 26 inside the housing body 10 through the lubricant inlet 21 under the drive of the lubricant pump. Since the temperature of the lubricant is higher than that of the cooling air, heat exchange occurs inside the housing body 10, and thus the lubricant temperature is lowered.

When the bypass valve 23 is open, lubricant may not go through the radiating oil channel 26. In this mode, the lubricant temperature can be raised quickly, and thus it can be applied at the time of starting to raise the APU temperature quickly, in order to make APU come into its best working status as soon as possible.

In order to realize the detection of the performance of the APU lubricant cooler, it is needed to monitor the operation state of the lubricant cooler and acquire the real-time relevant data in the operation of the lubricant cooler. The acquisition of such data is usually realized by the data systems provided by the aircraft manufacturer. For example, the Aircraft Condition Monitoring System (ACMS) of Airbus and the Aircraft Heath Monitor (AHM) system of Boeing. One character of these systems is that the operation data of the aircraft can be monitored instantly. Meanwhile, when certain trigger conditions are met, the message comprising a series of data information will be generated automatically. According to the obtained data of the performance of the APU lubricant cooler, from the change of the parameters of its performance, through continuous measurement of certain quantities which represent its function, the decline data of the performance of the APU lubricant cooler can thus be obtained. Making a analysis of the decline course of the performance of the APU lubricant cooler according to these decline data, the reliability of the APU lubricant cooler can thus be evaluated.

According to one embodiment of the invention, the relevant operation data of APU can be obtained by the aircraft data system (such as ACMS or AHM system) and reflected in the generated relevant messages. This kind of message information can be transferred to the ground by Aircraft Communications Addressing and Reporting System (ACARS), and further distributed to the servers of different airlines. According to one embodiment of the invention, APU message can also be transferred by the communicating device or system of Aviation Telecommunication Network (ATN).

Actually, as to the present flight data system, the monitoring of the performance of APU is existing. Therefore, the corresponding APU messages can be used, and transferred to the ground by ACARS or ATN. For example, the A13 message of Airbus, i.e. APU MES/IDLE REPORT, or the APU message of Boeing are just the cases. However, these monitored data have not been used for the detection of the decline phase of the performance of APU lubricant cooler.

In the following examples, the method for monitoring the performance of lubricant cooler according to the APU message is illustrated by taking the A13 message of Airbus as an example. The treatment of APU message of Boeing is similar to this method.

FIG. 3 shows an example of A13 message of Airbus. As shown in the figure, A13 message mainly comprises 4 parts of information, which are: the message heading, APU record information, the operation parameters in starting of the aircraft engine and the start parameter of APU.

The message heading is consisted of CC and C1 fields, and mainly includes the flight information of the aircraft, the segment wherein the message generated, the state of bleed valves, total air temperature (i.e. the outer temperature) and the like information. The APU record information is consisted of E1 field, comprising APU serial number, operation time and cycle and other information. The operation parameters in starting of the aircraft engine is consisted of N1 to S3 fields; wherein N1 and S1 represent the operation on the time of starting the first aircraft engine, N2 and S2 represent the operation on the time of starting the second aircraft engine, and N3 and S3 represent the slow-down state of APU after completing the starting of engine by APU.

A13 message comprises multiple parameters relevant to the operation of APU. Wherein, the operation of lubricant cooler is mainly characterized by a particular lubricant temperature (OTA) of the time since installation (TSR) of APU and load compressor inlet temperature (LCIT).

According to the working principle of the lubricant cooler shown in FIGS. 1 and 2, it can be seen that the lubricant cooler cools the lubricant through introducing the cooling air, and thus the temperature of lubricant is greatly influenced by the outer temperature. Therefore, the directly measured data of lubricant temperature (OTA) cannot objectively characterize the operation of lubricant cooler, and needs to be revised by the outer temperature.

From the above description, the APU of the aircraft supplies the air source to the aircraft engine by driving the load compressor to compress air. Since the air absorbed by load compressor comes from the outer atmosphere which is also the source of the cooled air of lubricant cooler. Thus, load compressor inlet temperature (LCIT) recorded in message represents the outer temperature. Therefore, the load compressor inlet temperature (LCIT) can be used for revising the directly monitored lubricant temperature. According to one embodiment of the invention, the revised lubricant temperature can be obtained by revising the formula OT=OTA−LCIT, wherein OT represents the revised lubricant temperature.

Figure 4A:
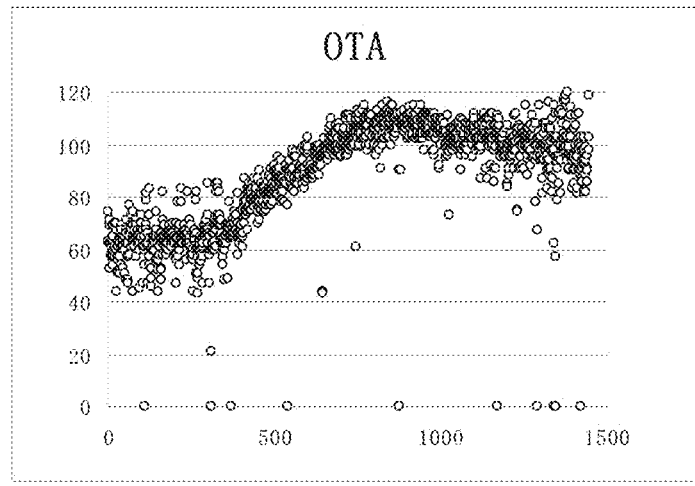
Figure 4B:
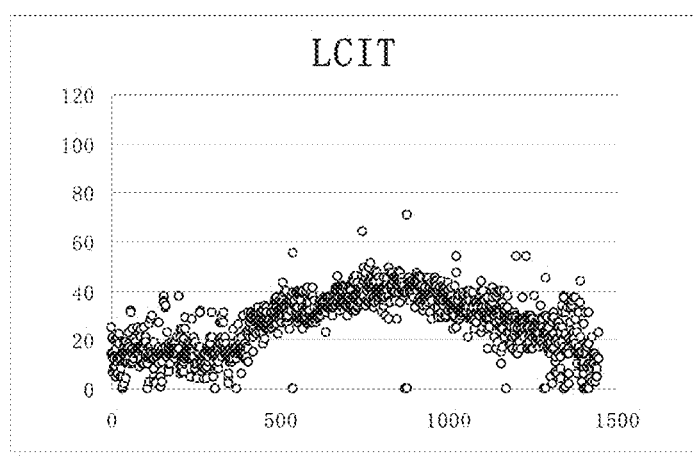
Figure 4C:
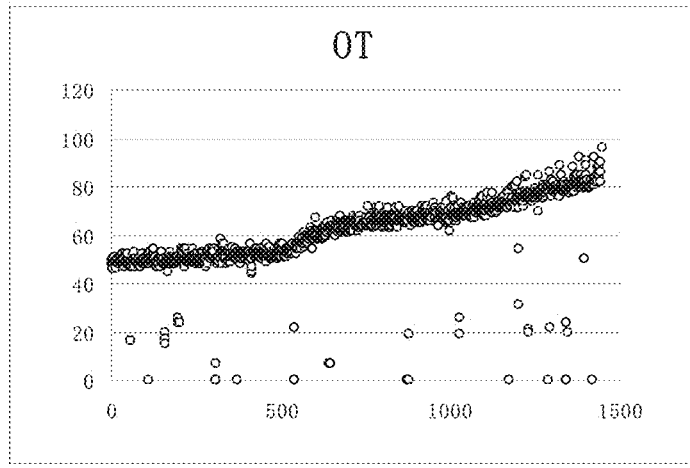

FIGS. 4a-c illustrate the revise course of the lubricant temperature according to one example of the invention, wherein, FIG. 4a shows the lubricant temperature OTA before revising; FIG. 4b shows the load compressor inlet temperature LCIT representing the outer temperature; FIG. 4c shows the revised lubricant temperature OT.

As shown in FIG. 4a, the change of the lubricant temperature OTA before revising is irregular. From FIG. 4b, it can be seen that the change trend of the load compressor inlet temperature LCIT is almost the same as the change trend of the lubricant temperature OTA before revision. Referring to FIG. 4c, the revised lubricant temperature OT presents a particular slow a regular pattern of slow change which reflects the change of performance of the lubricant cooler.

The change of the performance of the lubricant cooler is abide by certain rules: the performance of the lubricant cooler is relatively stable in the early and middle phases in use, and becomes declined in the late phase, finally a failure occurs. As the time goes by, the performance of the APU lubricant cooler declines gradually, and the temperature of lubricant shows a trend of increase, the decline index increases gradually. When the decline index of the performance of the APU lubricant cooler is relatively stable, the performance is in stable phase; when the decline of the performance of the APU lubricant cooler becomes faster gradually, the performance comes into decline phase; when exceeding some threshold value, the performance comes into malfunction phase, and a failure may occur at any time. When the APU lubricant cooler comes into decline phase, the use of APU is affected harmfully and adverse consequences will be brought to the quality of service and flying safety; moreover, non-planned maintenance tends to happen which causes the flight to delay and ground. There is no measure in the prior art to detect whether the performance of the APU lubricant cooler comes into the decline phase. But such detection can be realized by some examples of the invention.

The detection of decline phase has the following benefits: first, when APU lubricant cooler is in decline phase, the probability of the occurrence of a failure is still very low. If the maintenance/repair is proceeded on the aircraft at this time, the flying safety and quality of service can be guaranteed; second, when detecting that the APU lubricant cooler is in decline phase, the airline can arrange the maintenance/repair of the aircraft timely, and thus the non-planned maintenance can be avoided, the flight delay can be reduced accordingly, and therefore a waste of the cost for maintenance/repair resulted from the inspection in fixed period can be avoided at the same time. Of course, the example of the invention can also be applied for the inspection in malfunction phase.

Figure 5A:
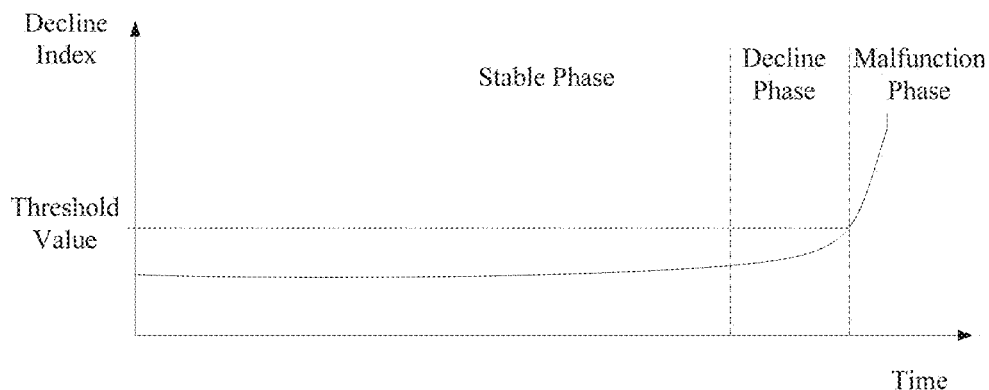
Figure 5B:
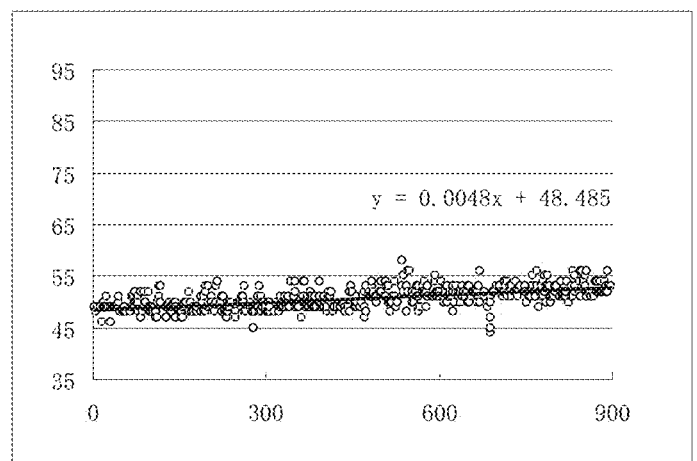
Figure 5C:
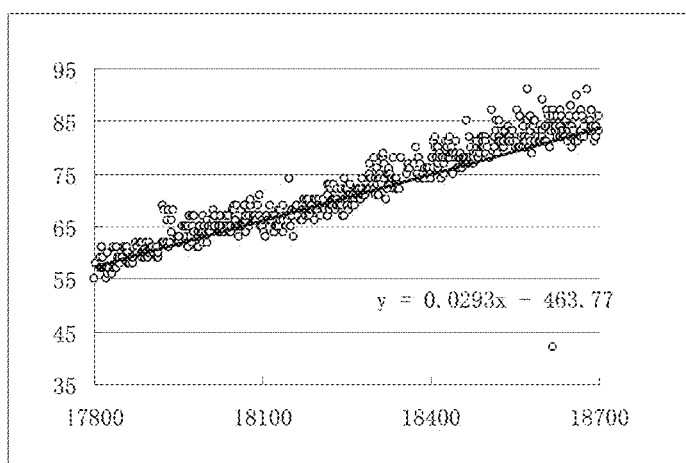
Figure 5D:
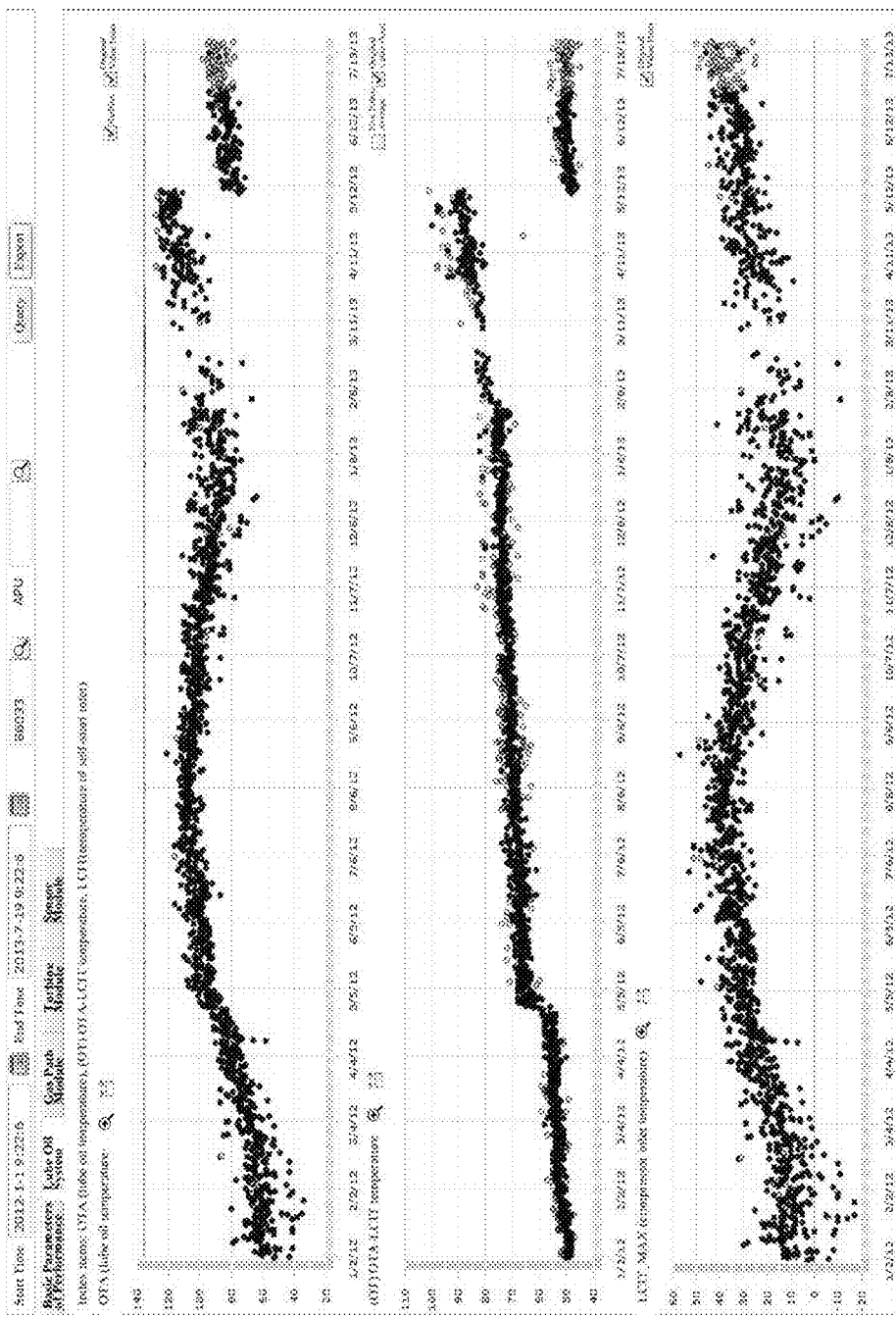

FIG. 5a is the schematic drawing showing a curve of the change of performance of the APU lubricant cooler. According to the change regulation of the performance of the APU lubricant cooler shown in FIG. 5a, through the statistical analysis of the lubricant temperature within a particular time range, judging the change trend of the lubricant temperature in the lubricant cooler, the detection of the performance of the APU lubricant cooler can be realized. FIG. 5b shows an example of the statistical trend of the performance data in early phase of operation, and FIG. 5c shows an example of the statistical trend of the performance data in late phase of operation. As shown in FIG. 5b, after linear-fitting of the data of the performance in early phase, the slope reflecting the change trend is 0.0048. As shown in FIG. 5c, after linear-fitting of the data of the performance in late phase, the slope reflecting the change trend is 0.0293, near 0.03. The change of slope fully reflect the different phases of the performance of the APU lubricant cooler. FIG. 5d shows an example of the statistical trend of the long-term performance data of the lubricant cooler. Wherein, the upper part of the figure is the change trend of the lubricant temperature OTA; the lower part of the figure is the change trend of the compressor inlet temperature; and the middle part is the change trend of the revised lubricant temperature OT. Wherein, the vertical solid line represents the replacement of the lubricant cooler. From the example of FIG. 5d, it can be seen clearly that, in quite a long time, OT increases gradually with a relatively fixed change trend (i.e. the slope after linear-fitting) constantly. However, the slope begins to rise gradually after passing by the dotted line region, and the upward trend becomes progressively faster. When coming into the failure region gradually, OTA is close to the red line value, the lubricant cooler is replaced at this time.

Figure 6:
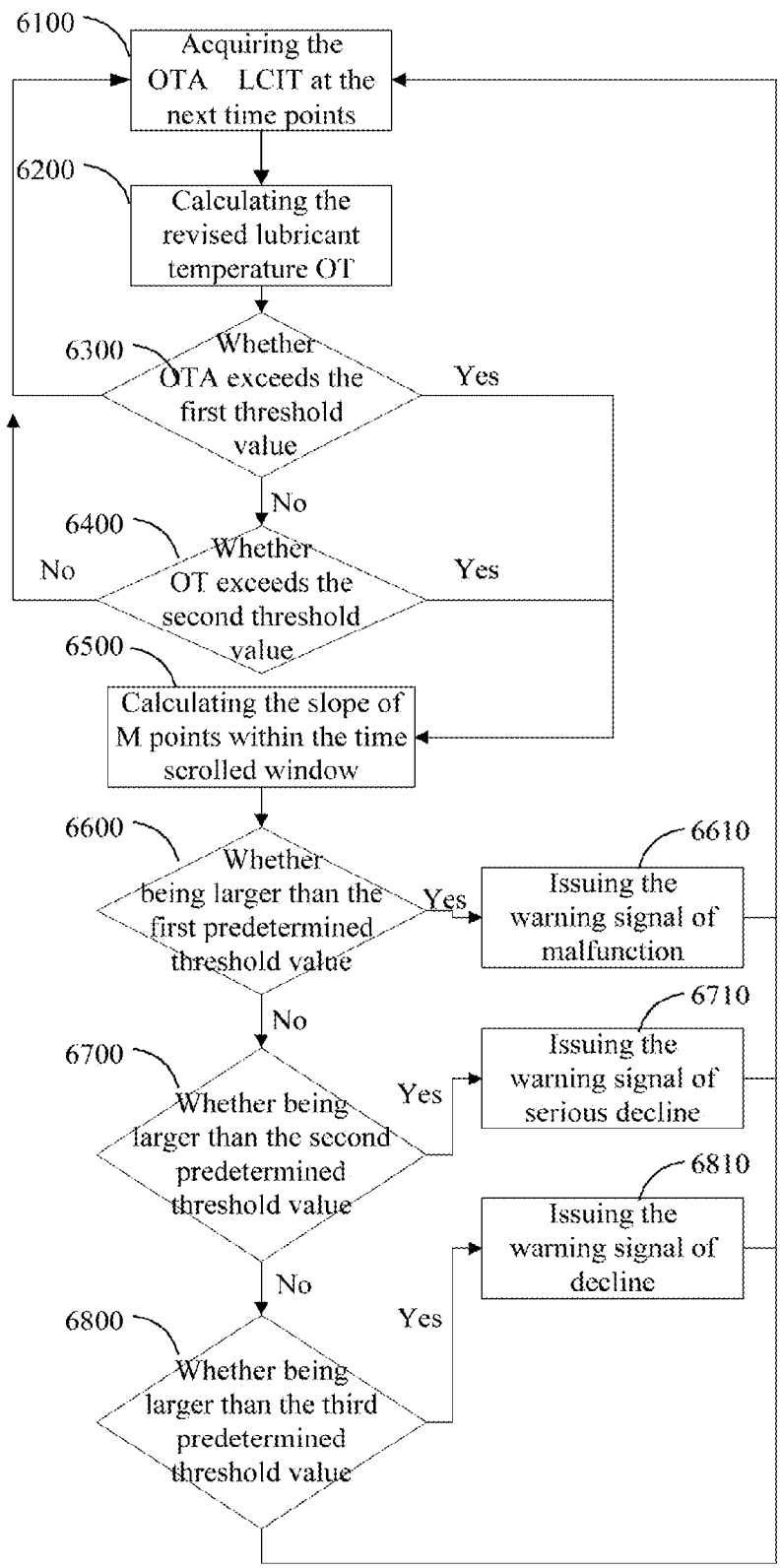
FIG. 6 is a flow diagram showing the of the detection method of the performance of the APU lubricant cooler according to one embodiment of the invention.

FIG. 6 is a flow diagram showing the of the detection method of the performance of the APU lubricant cooler according to one embodiment of the present invention. As shown in the FIG. 6, in the detection method 6000 for the performance of the APU lubricant cooler, in the step 6100, the following operation information of the APU of aircraft within a time period is acquired through APU messages, the time since installation (TSR) of APU, the load compressor inlet temperature (LCIT) and lubricant temperature OTA. In the step 6200, the lubricant temperature OTA is revised by the load compressor inlet temperature (LCIT), and the revised lubricant temperature OT within a time period can be obtained.

When the lubricant temperature exceeds a particular temperature, APU will overheat, and stop occurs. Therefore, the actual temperature of the APU lubricant needs to be detected. In step 6310, the detected lubricant temperature OTA is compared with the first threshold, if exceeding the first threshold, a warning signal of overheating of the lubricant is output. In step 6320, the revised lubricant temperature OTA is compared with the second threshold, if exceeding the second threshold, a warning signal of serious overheating of the lubricant is output. The first and second thresholds are determined by the design of APU. The aircraft APU of different models have different threshold values. Generally, the first threshold value is 5-10 degrees Celsius below the red line value. The second threshold value can be determined according to the first threshold value and the influence of the outer air temperature on the temperature of the inlet of the load compressor. Generally, the second threshold value is 30-50 Celsius degrees below the first threshold value, preferably 40 degrees Celsius. For example, according to one applied example of the invention, when the model of APU is APS3200, the first threshold is 135° C., and the second threshold is 95° C.; according to another applied example of the invention, when the model of APU is 131-9A, the first threshold is 162.78° C., and the second threshold is 122.78° C.

Further, in order to monitor the change trend of the temperature of lubricant, according to one example of the invention, calculating the linear-fitting slope reflecting the change of the temperature of the lubricant within a time range in order to judge the performance of the performance of the APU lubricant cooler.

It is assumed that a time scrolled window comprises M time points, in the step 6400, taking the time since installation (TSR) of APU as horizontal axis, and the revised lubricant temperature OT as vertical axis, and in the step 6500, calculating the slope of the M points within the time scrolled window. The size of scrolled window, i.e. the number M of points included within the range of calculation, depends on multiple factors, such as, the time interval of measurement, the control strategy and others. In case the size is too small, the change of slope is more easily influenced by the normal fluctuation of the lubricant temperature, and more error alarms/messages will be generated, the effect of the invention will be affected finally. If the size is too large, although the change trend can still correctly reflect the temperature of the lubricant, this can decrease the timeliness of the present invention, causing the warning information cannot be sent out timely. Therefore, the size of the scrolled window is important to the present invention. According to one example in the invention, the value of M is about 20 in case of measuring 2-3 points daily. According to another example in the invention, the value of M is about 10 in case of measuring no more than 2 point(s) daily. According to yet another example in the invention, the value of M is about 30 in case of measuring 4-5 points daily.

According to one embodiment of the present invention, the APU operation data can be obtained via the output APU messages when the aircraft is in operation. According to one example, the desired APU operation data can be obtained by triggering the logic in the customized messages automatically programmed in ACMS and acquiring the messages comprising the desired data. Wherein, according to one example, the logic can be triggered by programming the customized messages, and obtaining the APU operation data at the time point when APU load reaches the peak value. And according to another example, the logic can be triggered by programming the customized messages, and obtaining the APU operation data at the time point when APU load is identical (i.e., the APU load is a set value).

According to one example in the invention, in order to improve the accuracy in the calculation of the slope of the invention, and reduce the influence of the sudden change of the lubricant temperature data due to the sensor malfunction or human error. The step of discarding the bad points is also included before calculating the slope of the linear-fitting plot of the lubricant temperature within the scrolled window.

According to one example in the invention, if in the M points within the scrolled window, the difference between the value of one point and the average value of the closest p points is more than q times of the standard deviation of the closest p points, this point will not participate the calculation of the slope in the scrolled window, and wherein, in some examples, the value of p can be 4, 6 or 8; and the value of q is 2 or 3.

In step 6600, comparing whether the slope of the closest M points obtained in the last step exceeds the failure threshold value. If the slope exceeds failure value, the failure warning of the APU lubricant cooler is output in step 6610. In step 6700, comparing whether the slope of the closest M points obtained in the last step exceeds the threshold value of serious decline. If the slope exceeds the threshold value of serious decline, the warning of serious decline of the APU lubricant cooler is output in step 6710. In step 6800, comparing whether the slope of the closest M points obtained in the last step exceeds the decline threshold value. If the slope exceeds the decline threshold value, the decline warning of the APU lubricant cooler is output in step 6810. When generating the next obtainable data, the step 6100 will be repeated regardless of whether the warning signal is output or not, and entering the next cycle.

According to one example of the invention, it is preferred to analyze the general change trend when the APU lubricant cooler of a certain type when it is in stable phase, and, based on the change trend in stable phase as the standard, to further determine other threshold values. For examples, the decline threshold value is 1.5-2.5 times than the change trend of the stable phase, and the threshold value of the serious decline is 2.5-5 times than the change trend of the stable phase and the failure threshold value is 5-7 times than the change trend of the stable phase.

According to one example of the invention, in order to reduce the erroneous warning and improve the accuracy, the performance of the APU lubricant cooler entering the decline phase can only be confirmed when the decline warning is repeated 5 times continuously or in short time period; only if serious decline warning is repeated 3 times continuously or in short time period, it is can be confirmed that the performance of the APU lubricant cooler enters the serious decline phase; and only if failure warning is repeated 2 times continuously or in short time period, it is can be confirmed that the performance of the APU lubricant cooler enters the malfunction phase.

According to one example of the invention, the desired information in step 6100 can be obtained from the APU message of the A13 message. For example, the control centre of Society International De Telecommunication Aeronautiques (SITA) and the control centre of Aviation Data Communication Corporation (ADCC) can obtain the A13 message of the operation of the APU remotely in real-time, and decode the A13 message of the APU operation modes by message decoder, and achieve the desired operation information of the APU lubricant cooler.

If the APU operation message is not generated automatically in the aircraft data system, adding the corresponding sensor and trigger condition to generate the desired APU message. If the APU message already existed in the aircraft data system does not completely cover one or more of the desired lubricant OTA and load compressor inlet temperature LCIT, adding one or more missed measurement parameters by revising the generating conditions of APU message. Since APU message can be transferred to the data server of the airlines in real time through ACARS or ATN systems, the real time monitoring of the performance of APU can be realized. Of course, the mode of message transfer can avoid the high cost and human failure caused by manual mode.

According to one example of the invention, the desired information in step 6100 can be directly obtained through the aircraft data system, and no APU message is needed to be generated.

The above-mentioned method monitors the change trend of data of the operation state in a period of time when APU lubricant cooler is in operation. However, in the operation, some cases of poor operation of a sharp rise or fall in temperature in short time are also existed. The main cause for such case is the sudden failure of the lubricant cooler or sensor malfunction. According to one embodiment of the invention, the method for monitoring the performance of APU lubricant cooler further comprises monitoring the sudden change of its performance.

Figure 7:
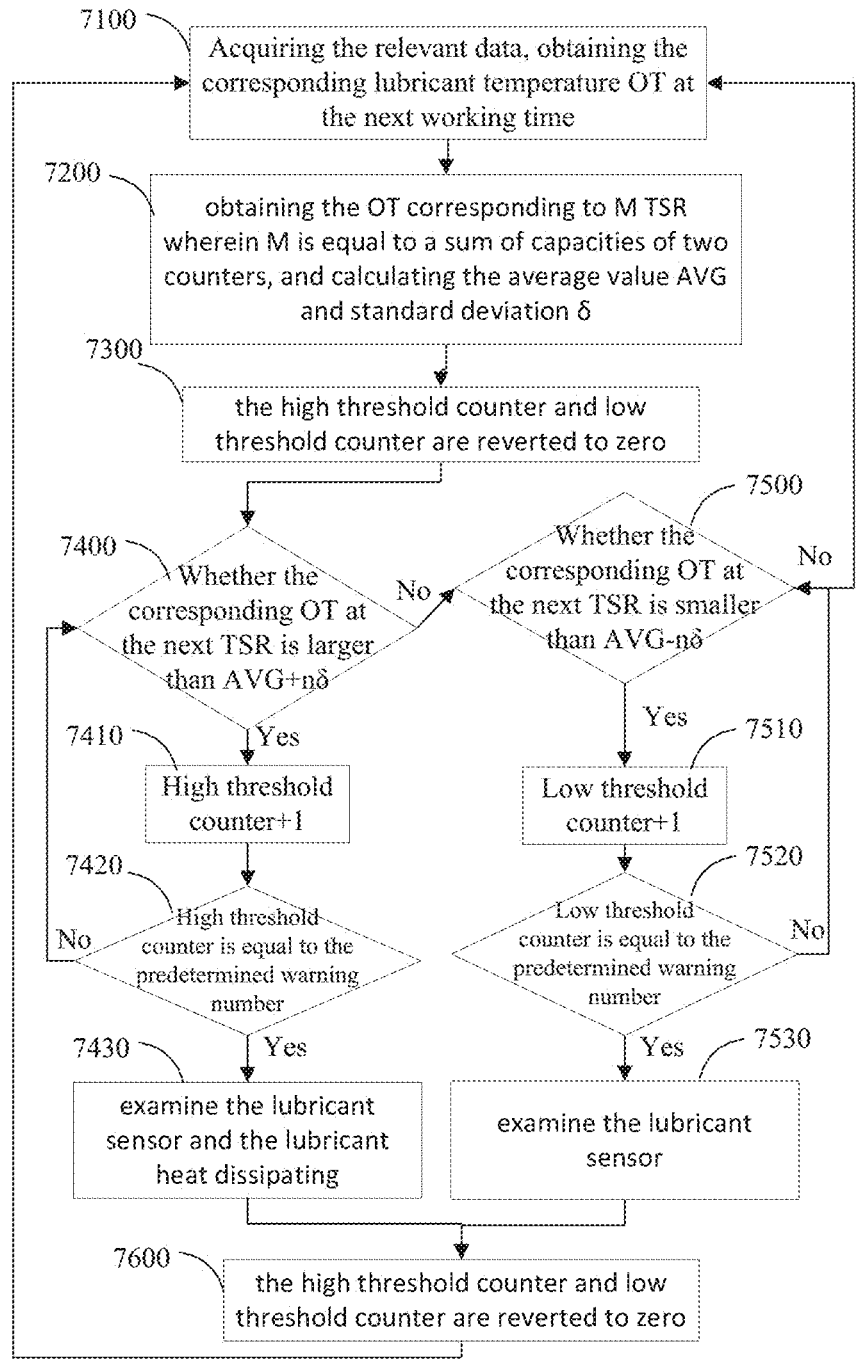
FIG. 7 is a flow diagram showing the of the detection method of the performance of the APU lubricant cooler according to one embodiment of the invention.

FIG. 7 is a flow diagram showing the detection method of the performance of the APU lubricant cooler according to another example of the invention. As shown in this figure, in the detection method 7000 of the performance of APU lubricant cooler, in step 7100, the actual lubricant temperature OT is obtained by acquiring the relevant operation data of aircraft APU lubricant cooler, such as the testing lubricant temperature OTA, the load compressor inlet temperature LCIT, within a working time period and subsequent revise. According to one example of the invention, this step can be performed in the way similar to above-mentioned steps 6100 and 6200.

In step 7200, obtaining the revised lubricant temperature OT corresponding to M data points wherein M is equal to a sum of capacities of high threshold counter and low threshold counter, and calculating the average value AVG and standard deviation $\delta$.

The purpose for evaluating the average value and standard deviation of a designated number of points is to set a range of change for the next point, but the value which may be noise needs to be removed. According to the following description, high threshold counter and low threshold counter are used for recording the deviation point which changes beyond the preset range. When the number of times the deviation points appear continuously do not reach the number of warning, these deviation points are not counted into the samples for calculating the average value and standard deviation. Therefore, when acquiring M samples, the pointer which is used to acquire the numerical value needs to be moved forward a number of points, wherein the number is the sum of the two counters, that is, taking the revised lubricant temperature OT corresponding to M data points in the front of the data points by the addition of high threshold counter and low threshold counter. According to one example of the invention, the value of M can be 20.

In step 7300, the high threshold counter and low threshold counter are reverted to zero, because that: as a result of the previous judgment, the deviation points are dispersed. The counter needs to be reverted to zero and recount. Counter of this mode can be realized by various ways.

In step 7400, judging whether the revised lubricant temperature OT corresponding to the next data point is greater than AVG+nδ. Wherein, the value of n is determined by control strategy. If the value of n is high, the control of abnormal point is loose, and consequently the number of error messages can be reduced this way, but the risk of failing to inform may exist; if the value of n is low, the control of abnormal points is stricter, and the risk of failure can be avoided, but too frequent useless warning will occur. Generally speaking, the value of n is between 1-5. According to one example of the invention, the value of n is 2 or 3.

If the judgment made by step 7400 is yes, entering step 7410, and high threshold value counter+1. In the next step, step 7420, judging whether the value of high threshold counter is equal to the preset warning number Z. If the judgment is no, returning step 7400. If the judgment is yes, it is demonstrating that the lubricant temperature OT continuously reaches the preset warning number Z which exceeds the preset normal variation range, and the temperature jumps upward, at this time, entering step 7430, warning signal is output, reminding to examine the lubricant sensor and the lubricant cooler.

According to one example of the invention, since a single temperature jump can be caused by various reasons, warning signal can be output under the condition that a certain numbers being exceeded, to exclude the error message. The value of the preset warning number Z is related to control strategy, and is generally 2-5, preferably 3.

If step 7400 is judged as no, entering step 7500, judging whether the revised lubricant temperature OT corresponding to the next operation time TSR is less than AVG−nδ. Wherein the principle of value n is stated above. If step 7500 is judged as yes, entering step 7510, the low threshold value counter+1. In the next step, step 7520, judging whether the value of the low threshold value counter is greater than the preset warning number Z. If the judgment is no, returning step 7500. If the judgment is yes, demonstrating that the lubricant temperature OT continuously reaches the preset warning number Z which exceeds the preset normal variation range, and the temperature jumps downward, at this time, entering step 7430, warning signal is output, reminding to examine the lubricant sensor.

No matter what kind of warning happens, the next step will enter step 7600, and the high and low threshold value counter is reverted to zero. This because that, if the number of continuously deviated points reaches the preset warning number, the occurrence of deviation points is not occasional, and the continuously deviated points cannot be excluded as noise. At this time, the counter is reverted to zero, and theses deviation points will be retained when entering step 7200 in the next cycle, and will be taken into calculation. When this step is finished, returning to step 7100.

In the invention, the methods for acquiring the operation parameters of APU lubricant cooler and revised lubricant temperature are the same as method 6000.

The monitoring method of the invention is further illustrated by a specific embodiment according to the invention.

Figure 8:
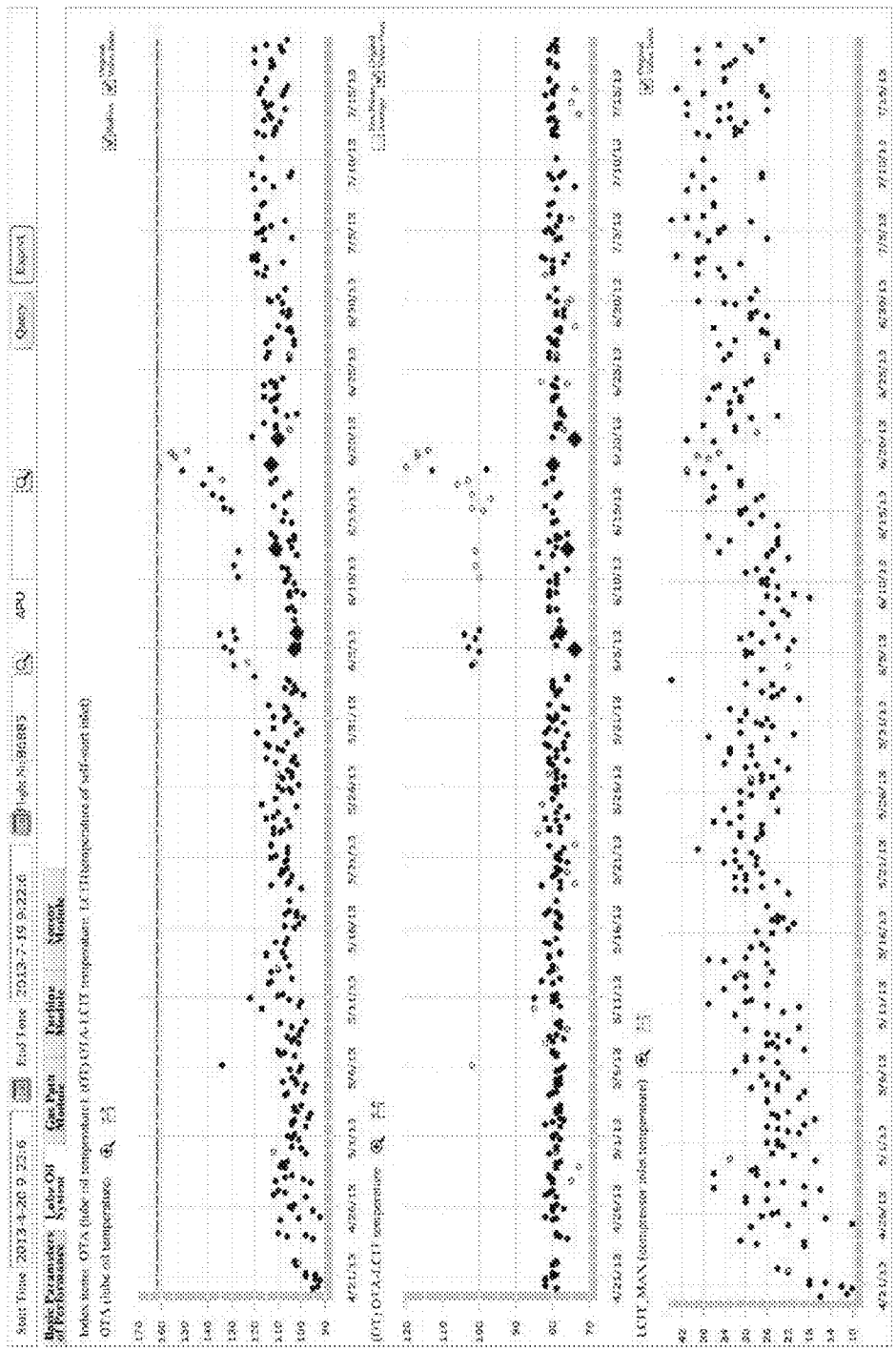
FIG. 8 shows a upward jump of the lubricant cooler temperature detected according to the method of the invention.

FIG. 8 shows an upward jump of the lubricant cooler temperature detected according to the method of the invention. As shown in FIG. 8, the upper part shows the change trend of the lubricant temperature OTA; and the lower part shows the change trend of the load compressor inlet temperature LCIT; and the middle part shows the change trend of the revised lubricant temperature OT. Wherein, the vertical line represents the replacement of the lubricant cooler. From the part depicted in dotted-line, multiple continuous high points occur in the revised lubricant temperature. According to the method of FIG. 7, the value of M is 20, and the value of n is 2, the value of preset warning number Z is 3. It is easily to find that after occurrence of multiple high points, a warning signal will be given out by the monitoring method in the embodiment in FIG. 7, and the performance of lubricant cooler is degraded.

The degraded performance of the lubricant cooler can be demonstrated by all of the following: the lubricant temperature exceeding the first threshold value, the revised lubricant temperature exceeding the second threshold value; the alteration of the change trend of the revised lubricant temperature or the jump of lubricant temperature.

According to one example of the invention, in the case that the performance of the lubricant cooler is degraded, the approximate time that the lubricant cooler encounters a failure can be predicted by the slope trend. According to one example of the invention, the median line of the change of the revised lubricant temperature can be obtained by non-linear regression, and the standard deviation of the change of the revised lubricant temperature, and performing the region estimation (confidence interval estimation) according to the median line and standard deviation of the change of the revised lubricant temperature, and the borderline of the region is obtained. The confidence interval estimation by other methods can also be used in the invention. Then, the time corresponding to the two intersecting points of the borderline of the region by extension with the redline value of the revised lubricant temperature are the estimated time zone of the lubricant cooler on failure. It is very useful to predict the approximate time when the lubricant cooler encounters a failure for arranging the maintenance plan, thus reduce the delay and grounding of the airplane, and reduce the maintenance cost and inventory cost for repair parts.

Figure 9:
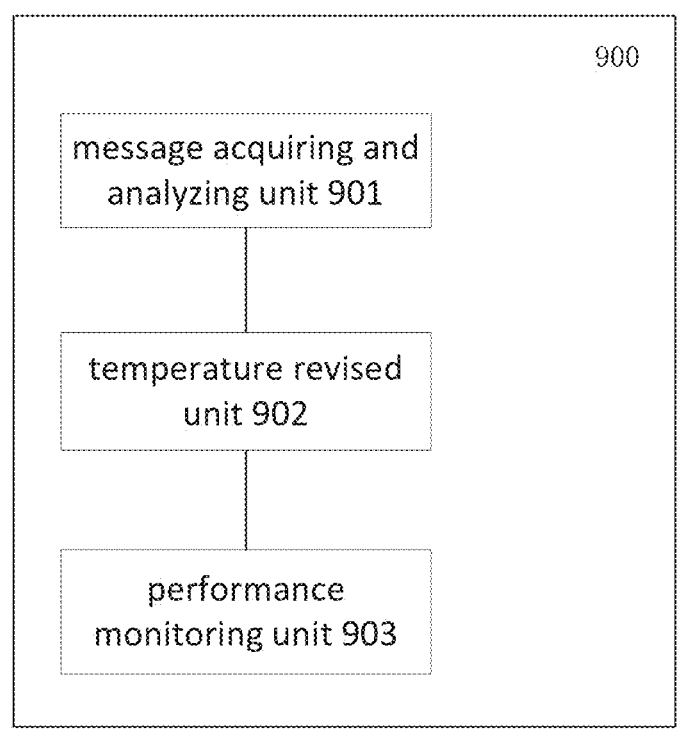
FIG. 9 shows a device for monitoring the performance of the APU lubricant cooler according to one embodiment of the invention.

FIG. 9 shows a device for monitoring the performance of the APU lubricant cooler according to one embodiment of the invention. As shown in FIG. 9, the device 900 for monitoring the performance of the APU lubricant cooler comprises message acquiring and analyzing unit 901, temperature revised unit 902 and performance monitoring unit 903.

The relevant operation data of APU can be acquired by aircraft data system (such as ACMS or AHM system) and be embodied in the relevant messages generated. This kind of message information can be transferred to the ground by ACARS system, and further distributed to the servers of different airlines. According to one embodiment of the invention, APU message can also be transferred by the communicating device or system of Aviation Telecommunication Network (ATN). The message acquiring and analyzing unit can obtain the APU message within a time period, and analyze the desired operation data of the lubricant cooler.

According to the operation data of APU lubricant cooler obtained by message acquiring and analyzing unit 901, such as the time since installation (TSR) of APU, lubricant temperature OTA and load compressor inlet temperature (LCIT). The temperature revised unit 902 revises the lubricant temperature. According to one example of the invention, the formula for revising the lubricant temperature is: revised lubricant temperature OT=lubricant temperature OTA−load compressor inlet temperature LCIT.

Performance monitoring unit 903 determines that the performance of the APU lubricant cooler is in stable phase, decline phase, serious decline phase or malfunction phase according to the change trend of the revised lubricant cooler OT against the time since installation (TSR) of APU. The monitoring method can be similar as the above-stated embodiments of the invention.

According to one example of the invention, the invention can be carried out by the device for monitoring the performance of APU lubricant cooler. The device comprises processor and memory. The memory stores the computer-readable codes. The computer-readable codes can be performed in the processor to implement the method for monitoring the performance of APU lubricant cooler disclosed in the above embodiments of the invention.

The above embodiments are only described for illustrating the present invention, and do not mean to limit the present invention. A person with ordinary skill in relevant art may make various changes and variations without departing from the scope of the present invention. Therefore, all equivalent technical solutions shall also fall within the disclosure of the present invention.

We claim:

1. A method for monitoring performance of an aircraft auxiliary power unit APU lubricant cooler, comprising:
   acquiring APU messages within a time period;
   obtaining the operation parameters of the APU lubricant cooler according to the APU messages, the operation parameters including lubricant temperature OTA and load compressor inlet temperature LCIT;
   obtaining a revised lubricant temperature OT by:
      revised lubricant temperature OT=lubricant temperature OTA−load compressor inlet temperature LCIT; and
   determining whether the performance of the APU lubricant cooler is in stable phase, decline phase or malfunction phase according to change trend of the revised lubricant temperature OT with respect to time, the determining comprising:
      in response to the change trend is less than a threshold value of decline, determining the performance of the APU lubricant cooler is in stable phase;
      in response to the change trend is greater than the threshold value of decline and less than a threshold value of malfunction, determining the performance of the APU lubricant cooler is in decline phase; and
      in response to the change trend is greater than the threshold value of malfunction, determining the performance of the APU lubricant cooler is in malfunction phase; and
      determining stable change trend of the revised lubricant temperature OT with respect to time when the APU lubricant cooler is in stable phase;
   wherein, the threshold value of the decline phase is around 1.5-2.5 times than the stable change trend, and the threshold value of malfunction is around 5-7 times than the stable change trend.

2. The method of claim 1, wherein, the decline phase further comprises serious decline phase, and a threshold value of serious decline is between the threshold values of the decline and malfunction, in response to the change trend is greater than the threshold value of the serious decline and less than the threshold value of malfunction, determining the performance of the APU lubricant cooler is in serious decline phase; wherein the method further comprises:
   determining the stable change trend of the revised lubricant temperature OT with respect to time when the APU oil lube cooler is in stable phase;
   wherein, the threshold value of the serious decline is around 2.5-5 times than the stable change trend.

3. The method of claim 1, further comprising: the time is time since installation TSR of APU.

4. The method of claim 1, wherein the time period is about 5-10 days.

5. The method of claim 1, wherein about 20-30 APU messages are obtained within the time period.

6. The method of claim 1, wherein the APU messages are triggered to obtain the operation parameters when an APU load is at its peak.

7. The method of claim 1, wherein a plurality of the APU messages are triggered to obtain the operation parameters in a same APU load.

8. The method of claim 1, further comprising:
   in response to the lubricant temperature OTA exceeding a first threshold, issuing a warning signal.

9. The method of claim 1, further comprising:
   in response to the revised lubricant temperature OT exceeding a second threshold, issuing a warning signal.

10. The method of claim 1, further comprising:
    calculating an average value AVG and a deviation index $\delta$ of the revised lubricant temperature OT within the time period;
    determining a revised lubricant temperature $OT_{next}$ obtained according to the next message related to APU; and
    in response to the revised lubricant temperature $OT_{next}$ being greater than AVG+n$\delta$ or less than AVG−n$\delta$, determining whether a subsequent revised lubricant temperature $OT_{next+1}$ obtained according to a follow-up next message related to APU is equal or greater than AVG+n$\delta$ or less than AVG−n$\delta$; and
    in response to a number of times for consecutive revised lubricant temperature obtained according to consecutive message related to APU being equal or greater than AVG+n$\delta$ or less than AVG−n$\delta$ and exceeding a predetermined number Z, issuing a warning;
    wherein n is 2-5, and Z is 3-5.

11. The method of claim 10, in response to that the revised lubricant temperature $OT_{next}$ obtained according to the next message related to APU is greater than AVG+n$\delta$ or less than AVG−n$\delta$, recalculating the average value AVG and deviation index $\delta$ of the revised lubricant temperature OT.

12. The method of claim 10, in response to the number of times for consecutive revised lubricant temperature obtained according to consecutive messages related to APU is equal or greater than AVG+n$\delta$ or less than AVG−n$\delta$ and exceeds the predetermined number Z, recalculating the average value AVG and deviation index $\delta$ of the revised lubricant temperature OT.

13. The method of claim 10, wherein the deviation index $\delta$ is standard deviation.

14. The method of claim 10, wherein the value of n is 2 or 3.

15. According to the method of claim 10, wherein the value of Z is 3.

16. According to the method of claim 10, further comprising:
in response to the revised lubricant temperature obtained according to the message related to APU is greater than AVG+nδ continuously and exceeding the predetermined number Z, issuing a warning of lubricant cooler.

17. The method of claim 10, further comprising:
response to the revised lubricant temperature obtained according to the message related to APU is greater than AVG-nδ continuously and exceeding the predetermined number Z, issuing a warning of sensor.

18. The method of claim 1, further comprising:
estimating a time when a lubricant sensor encounter a malfunction.

19. A device for monitoring performance of a lubricant cooler in aircraft auxiliary power unit APU, comprising a processor and a memory for storing computer readable instructions for instructing the processor implementing the following units:
a message acquiring and analyzing unit, configured to acquire APU messages within a time period, and obtain the operation parameters of the APU lubricant cooler, the operation parameters includes: time since installation TSR of APU, lubricant temperature OTA and load compressor inlet temperature LCIT;
a temperature revised unit, configured to obtain revised temperature of lubricant OT:
revised temperature of lubricant OT=lubricant temperature OTA−load compressor inlet temperature LCIT; and
a performance monitoring unit, configured to determine that the performance of the APU lubricant cooler is in stable phase, decline phase, serious decline phase or malfunction phase according to change trend of the revised lubricant cooler OT against the time since installation (TSR) of APU determined by:
in response to the change trend being less than a threshold value of decline, determining the performance of the APU lubricant cooler is in stable phase;
in response to the change trend being greater than the threshold value of decline and less than a threshold value of malfunction, determining the performance of the APU lubricant cooler is in decline phase; and
in response to the change trend being greater than the threshold value of malfunction, determining the performance of the APU lubricant cooler is in malfunction phase; and
determining stable change trend of the revised lubricant temperature OT with respect to time when the APU lubricant cooler is in stable phase;
wherein, the threshold value of the decline phase is around 1.5-2.5 times the stable change trend, and the threshold value of malfunction is around 5-7 times the stable change trend.

20. A device for monitoring performance of a lubricant cooler in aircraft auxiliary power unit APU, comprising:
a processor; and
a memory linked with the processor, which stores computer-readable codes;
the computer-readable codes run in the processor to execute the following steps:
acquiring APU messages within a time period;
obtaining the operation parameters of the APU lubricant cooler, the operation parameters includes: time since installation TSR of APU, lubricant temperature OTA and load compressor inlet temperature LCIT;
revised temperature of lubricant OT is obtained by:
revised temperature of lubricant OT=lubricant temperature OTA−load compressor inlet temperature LCIT;
determining that the performance of the APU lubricant cooler is in stable phase, decline phase, serious decline phase or malfunction phase according to change trend of the revised lubricant cooler OT against the time since installation (TSR) of APU, the determining comprising:
in response to the change trend being less than a threshold value of decline, determining the performance of the APU lubricant cooler is in stable phase;
in response to the change trend being greater than the threshold value of decline and less than a threshold value of malfunction, determining the performance of the APU lubricant cooler is in decline phase; and
in response to the change trend being greater than the threshold value of malfunction, determining the performance of the APU lubricant cooler is in malfunction phase; and
determining stable change trend of the revised lubricant temperature OT with respect to time when the APU lubricant cooler is in stable phase;
wherein, the threshold value of the decline phase is around 1.5-2.5 times the stable change trend, and the threshold value of malfunction is around 5-7 times the stable change trend.

\* \* \* \* \*